Dec. 22, 1942. A. FRANZ 2,305,766
COWLING FOR REACTION EXHAUST CONDUITS
Filed Aug. 24, 1939
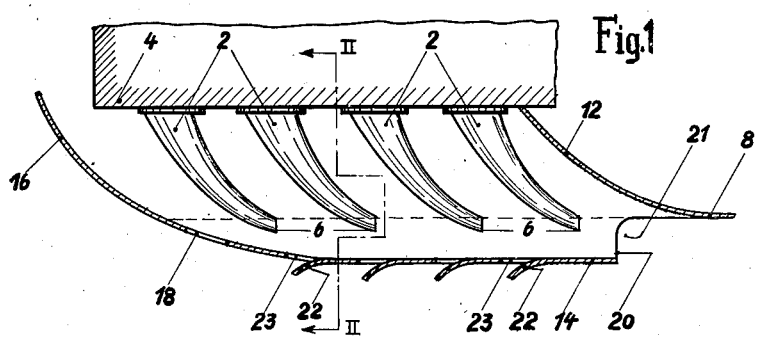
Fig. 1
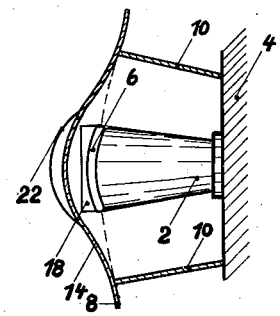
Fig. 2
Fig. 3
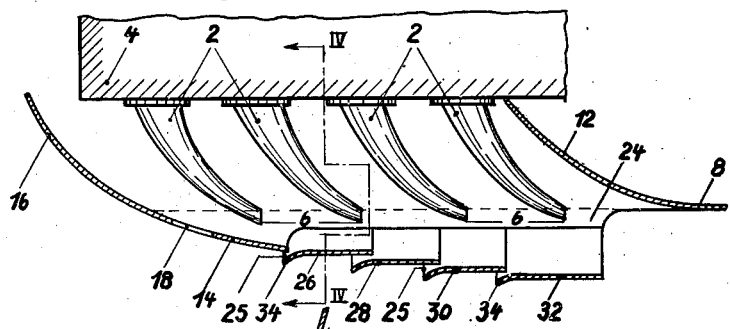
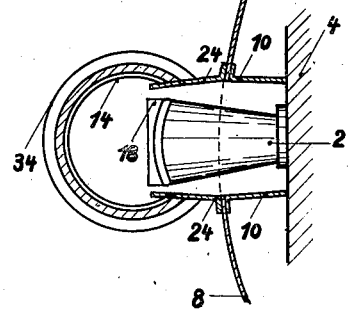
Fig. 4
Inventor:
Anselm Franz,
Bailey & Carson
Attorneys Patented Dec. 22, 1942

2,305,766

UNITED STATES PATENT OFFICE 2,305,766

COWLING FOR REACTION EXHAUST CONDUITS

Anselm Franz, Dessau, Germany; vested in the Alien Property Custodian

Application August 24, 1939, Serial No. 291,734
In Germany September 3, 1938

6 Claims. (Cl. 60—35.6)

This invention is directed to an improved cowling for the exhaust conduits of an internal combustion engine, which conduits are formed as reaction or recoil producing nozzles to aid in the forward propulsion of an aircraft.

Exhaust conduits of this type are constructed as short stacks projecting from the engine block, and having their outlet ends bent as constricted nozzles pointed toward the rear of the aircraft. It is desirable to cover these conduits with a streamlined cowling in order to reduce their drag, but the function of the conduits as reaction nozzles demands that the gases be exhausted into the open, as otherwise a large part of the recoil producing energy is nullified by the formation of eddy currents. Prior known cowlings have failed to reduce the drag of the conduits while at the same time allowing the gases to be exhausted without the formation of the energy destroying eddy currents.

An object of this invention is to provide a cowling for the reaction type conduits which materially reduces the drag of the conduits without the formation of eddy currents in the exhausted gases.

Another object of the invention is to employ the air flowing by the cowling covering the exhaust conduits as a means of producing a reactive force upon the cowling which diminishes the drag force produced by the cowling.

Generally these objects of the invention are obtained by covering the conduits with a streamlined cowling into which the gases are exhausted from the conduit nozzles. Openings are provided in the nose and rear of the cowling so that a current of air flows therethrough which is accelerated by the exhaust gases discharged from the conduit nozzles, and other openings are provided in the surface of the cowling through which additional air is sucked by the accelerated aspirating currents within the cowling to produce forces, similar to those formed upon the runner of a turbine, which forces are counter to the drag of the cowling, and thus act to lower the total drag of the cowling.

The means by which the objects of the invention are obtained may be more fully understood with reference to the accompanying drawing, in which:

Fig. 1 is a plan view, partly in section, of a cowling constructed according to the invention;

Fig. 2 is a cross-sectional view on the line II—II of Fig. 1;

Fig. 3 is a view similar to Fig. 1, but showing a modified form of cowling; and

Fig. 4 is a cross-sectional view on the line IV—IV of Fig. 3.

In Fig. 1, individual stacks or exhaust conduits 2 extend from engine block 4 outwardly until their rearwardly directed outlet nozzles 6 project slightly beyond the plane of the aircraft covering 8. Side walls 10, and rear wall 12, close off the space containing conduits 2 from adjoining portions of the aircraft.

Nozzles 6 are covered by cowling 14, which may be formed integral with aircraft covering as shown, or may be formed as a separate member and secured to the covering by any conventional means. The forward end of cowling 14 is substantially continuous with the nose 16 of the engine housing, and an air inlet opening 18 is formed in this forward end. Cowling 14 tapers slightly outwardly from covering 8 to its rear edge 20 which lies beyond the rearmost conduit 2. Wall 12 is joined to covering 8 some distance rearwardly of edge 20 whereby an outlet opening 21 is created for the escape of the exhaust gases emitted from conduits 2. Cowling 14 is spaced a sufficient distance from nozzles 6 so that few eddy currents are formed by the gases emitted by the nozzles. Air entering opening 18 flows through the cowling over the nozzles 6. As the velocity of the gases discharged from the nozzles is greater than that of the air entering opening 18, the velocity of the air at opening 18 being dependent upon the speed of the aircraft, the air stream is accelerated by the exhaust gases, and also the nozzles 6 are cooled by the air. This air current, together with the exhaust gases is discharged through opening 21.

Nozzle-like openings 23 are formed in outer wall of cowling 14 by slitting and bending the cowling to form flanges 22. The aspirating effect of the air and exhaust gases flowing within the cowling draws additional air through openings 23 into the cowling. The diversion of the air streams through openings 23 produces two advantageous results. First, the strata of air caused by the skin friction of the outer cowling surface is disturbed and drawn off. As this strata has a reduced velocity and causes eddy currents and other turbulence in the adjacent strata of air flowing by the aircraft, its removal immediately reduces the cowling drag. Secondly, air flowing through openings 23 produces a reduction of pressure on the sides of flanges 22 adjacent openings 23, and thus a positive pressure is created on the opposite sides of flanges 22, and the resultant of the forces thus obtained is directed toward the direction of aircraft flight. This effect is substantially similar to that produced upon the blades of a reaction turbine, and thus creates forces directed toward the front of the cowling and counter to the drag of the cowling, whereby the total frontal resistance of the cowling is reduced to a minimum.

The structure of Figs. 3 and 4 is similar to that shown for Figs. 1 and 2, except a different means is employed to form openings corresponding to the openings 23 in Fig. 1. A short distance to the rear of opening 18, the outer wall of the cowling is cut away, thus leaving but short side walls 24 extending along opposite sides of nozzles 6. The space left by this cut away portion is covered by a plurality of arcuate members 26, 28, 30 and 32, respectively, each of which is lapped upon and spaced from the preceding member. These members are preferably of circular section, and progressively increased in size so that slot-like openings 25 are formed between their lapped edges. The forward edge 34 of each member is flared outwardly, and the members are secured to walls 24, or to any other retaining device which may be desired.

Air entering nozzle-like slot openings 25 between adjacent rings produces counterforces to the drag of the cowling in the manner described for openings 23 in Fig. 1.

The invention thus provides a streamlined cowling which reduces the frontal resistance of the reaction type exhaust conduits, while at the same time creates aspirating air currents which prevent the formation of energy destroying eddy currents exteriorly of the cowling, and produce counterforces which counteract the drag of the cowling itself.

Having now described a means by which the objects of this invention may be obtained, what I claim as new and desire to secure by Letters Patent is:

I claim:

1. A cowling for a line of reaction type exhaust conduits of an internal combustion engine comprising a streamlined member covering at least the foremost conduit in the line of conduits, and a plurality of arcuate members successively lapped upon and spaced from each other covering the remainder of the conduits in said line of conduits.

2. In an internal combustion engine including an engine housing and reaction type exhaust conduits projecting through an elongated opening in said housing, a cowling covering said conduits comprising a streamlined member having its forward end substantially continuous with said housing, and having its rear end spaced from said housing to form an opening therebetween, air inlet means adjacent the forward end of said member for admitting cooling air to within said cowling, and reaction producing air inlet means in the outer wall of said member for admitting additional cooling air to within said cowling while simultaneously producing a reactive effect in the direction of that produced by said conduits.

3. A cowling for covering reaction type nozzles formed on the exhaust conduits of an internal combustion engine comprising streamlined cover means for producing an air current past said nozzles and means responsive to said air current for producing forces counter to the drag of said cover means.

4. A cowling for covering reaction type nozzles formed on the exhuast conduits of an internal combustion engine, and which project outwardly of the motor housing, comprising a streamlined substantially U-shaped in section cover enclosing said nozzles, air inlet and air outlet means for producing an air current by said nozzles, and a plurality of openings in the bight of the U-section for producing in response to an aspirating effect of said air current, forces counter to the drag of said cover.

5. A cowling as in claim 4, a plurality of flanges adjacent said openings for giving said openings a nozzle-like form.

6. A cowling for reaction type exhaust conduits of an internal combustion engine comprising a streamlined member covering at least the outlet ends of said conduits, openings in said member for admitting air into said cowling by reason of the aspirating effect of gases flowing within said cowling, and flange means adjacent said openings for producing a propulsive force from the air currents passing through said openings.

ANSELM FRANZ.